July 7, 1953  M. A. POWERS  2,644,662
LOW RATE OIL FLOW VALVE
Filed May 20, 1946  2 Sheets-Sheet 1
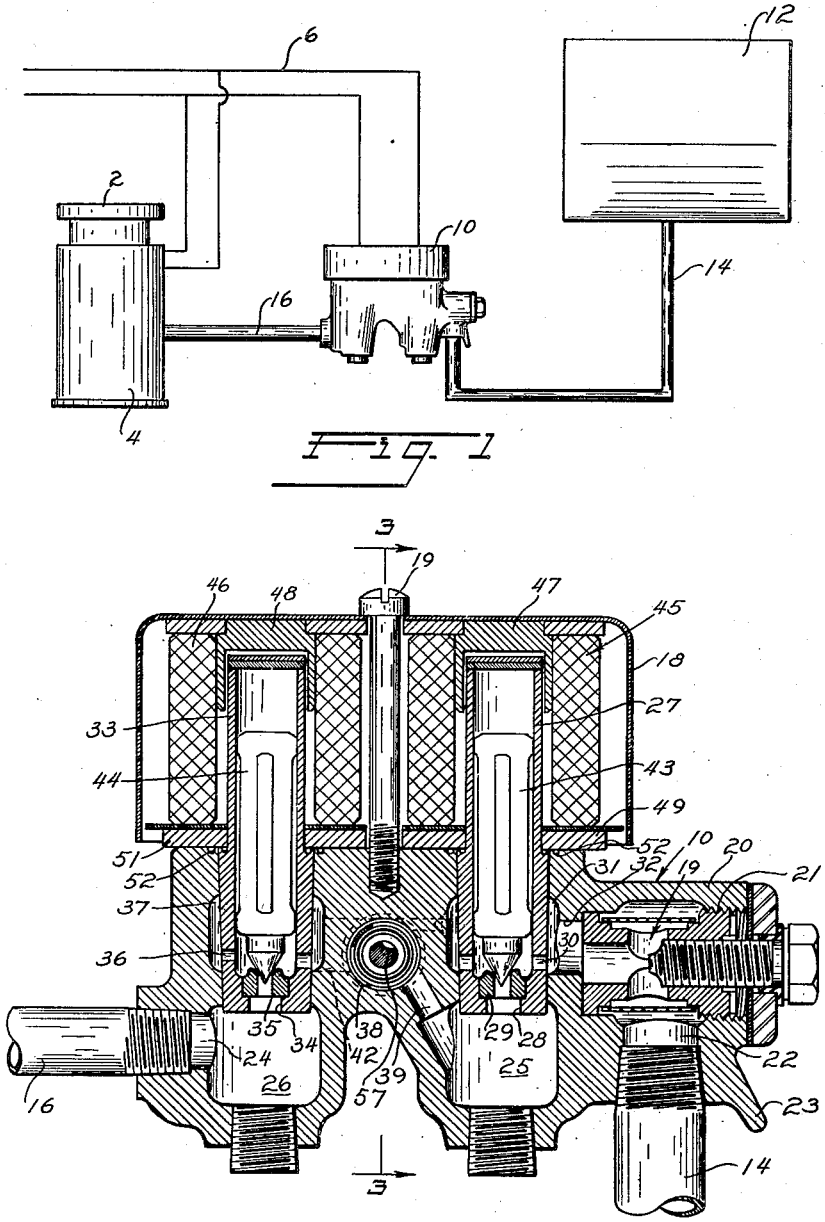
INVENTOR.
MILTON A. POWERS
BY
Strauch & Hoffman
ATTORNEYS July 7, 1953      M. A. POWERS      2,644,662

LOW RATE OIL FLOW VALVE

Filed May 20, 1946      2 Sheets-Sheet 2

INVENTOR.
MILTON A. POWERS.
BY
Strauch & Hoffman
Attorneys.

Patented July 7, 1953

2,644,662

UNITED STATES PATENT OFFICE 2,644,662

LOW RATE OIL FLOW VALVE

Milton A. Powers, Detroit, Mich., assignor to The Timken-Detroit Axle Company, Detroit, Mich., a corporation of Ohio Application May 20, 1946, Serial No. 671,052

6 Claims. (Cl. 251—34)

This invention relates generally to liquid flow regulating valves and is particularly concerned with such valves capable of accurate adjustment for low rates of flow of liquid therethrough, and for maintaining said flow substantially constant thereafter.

The invention, although suitable for varied uses, is particularly adapted for use with oil burner systems for controlling the rate of gravity flow of oil to a burner.

As the cost of domestic burner installation has been decreasing steadily for many years, a constantly increasing percentage of the total number in use have found their way into small homes. In these small homes the rate of oil flow for satisfactory heating must not greatly exceed the maximum heat loss of the house, and as new small homes are better insulated even less oil per hour must be burned for adequate heating. As a matter of fact an oil flow of one gallon per hour is relatively large, and on many thousands of installations the maximum allowable oil flow does not exceed one-half gallon per hour.

It is also essential for efficiency and reliable functioning that this oil flow be as nearly constant as possible at all times and that it remain free from any clogging action which would tend to reduce the rate of flow at any time during use.

On the usual installation the head of oil which causes the flow from tank to burner is relatively low usually under one pound per square inch pressure. Even so, the orifice to produce a one-half gallon per hour flow is quite small and very sensitive to any accumulation of solid foreign matter or adhesion of waxes or gums in the oil.

Fuel supply control valves heretofore provided in oil burner systems usually comprise a cylindrical valve stem rotatably threadedly mounted and having a portion of its extremity cut away or slotted in such manner that, when it is projected into a cylindrical passage or bore in a valve body, an orifice or variable size for restricting the flow of fuel is formed between the wall of the passage and the slotted surface of the valve stem. The size of the orifice so formed depends upon the axial distance that the said valve stem is projected into the said passage.

It has been found that these prior supply control valves do not supply fuel at a constant rate, due to the uncontrolled leakage of oil between the stem and passage surfaces permitted by the clearances between the control valve stem and the passage into which it projects. These clearances, which are in the order of .001 inch to .004 inch are made as small as practical to avoid excessive oil leakage, but are necessary as a manufacturing tolerance to accommodate the eccentricity of the valve stem relative to the passage when the stem is rotated during adjustment. During operation these clearances become clogged by foreign matter in the oil thereby changing the oil flow rate, and this variation becomes extremely important at low oil flow rates.

The present invention removes the need for clearances between the valve stem and the passage, thereby eliminating uncontrolled leakage around the valve stem and concentrating all control in the main adjustable opening which is substantially free from such variations.

In a preferred embodiment of this invention, a valve stem is projected through the close fitting opening of a flat sided valve element or washer which otherwise closes the passage surrounding the valve stem and the relative axial displacement of valve stem and the washer determines the size of the orifice for controlling the flow of fuel. The washer is sealingly seated against a flat annular shoulder face in the valve body by an axially directed compression spring but is allowed sufficient radial float during assembly and adjustment to eliminate the effect of relative valve stem and passage eccentricity as will appear below. The valve stem, being projected through a shallow thin washer instead of the elongated passage as in prior valves, offers the additional advantage of providing a restricted area passage for only a short axial distance, thereby rendering less possible any clogging of the said restricted area passage by the fuel oil or foreign particles in the fuel than in prior devices where a longer passage was defined by the stem and bore.

It is therefore the major object of this invention to provide an improved fuel supply regulating valve having more accurate and reliable adjustment at low fuel feeding rates than heretofore has been possible and which will maintain the adjusted oil flow constant thereafter.

It is a further object of the invention to provide an oil supply control valve wherein an axially adjustable valve stem projects into a bore with the provision of adequately large clearances to eliminate the effect of possible eccentricities in the stem or bore upon rotation of the valve stem and a novel radially floating valve seat and orifice forming arrangement is provided for accurate metering of fuel flow through the valve.

A further object of the invention is to provide a novel valve stem and associated radially floating, resiliently maintained valve seating arrangement in a fluid flow control valve.

Another object of this invention resides in the provision of a Monel or like metal valve seat which is non-magnetic and will resist the corrosive effect of certain organic acids and other chemicals usually present in some fluid fuels.

Another object of this invention is the embodiment of a normally closed air-bleeder valve for an internal chamber of a fuel flow regulator valve, for purging air pockets from the oil in the valve.

Another object of this invention is the provision of a suitable lip on the valve body which, when the strainer is removed, will deflect the flow of the leaking oil to a drain pan, or the like thereby keeping the surfaces of the other parts of the mechanism and the floor free from fluid fuel.

These and other objects will become apparent as the specification continues in connection with the appended claims and the annexed drawings wherein:

Figure 1 is a diagrammatic view of a fluid fuel burner system provided with the improved valve of this invention;

Figure 2 is a substantially central section through a valve according a preferred embodiment of this invention along line 2—2 in Figure 3;

The specification proceeds with continued reference to the drawings wherein like numerals designate the same parts throughout the several figures.

Figure 3:
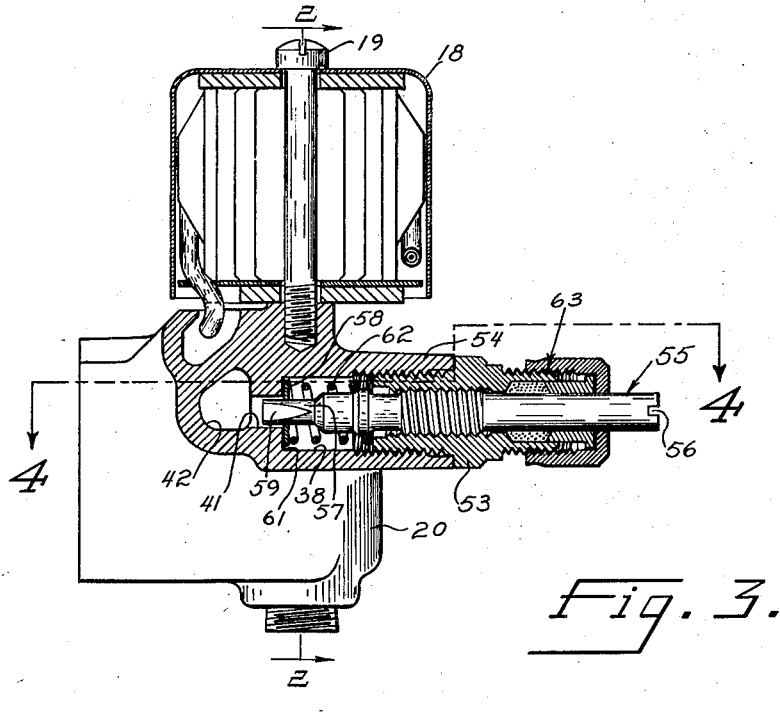
Figure 3 is a section substantially along line 3—3 of Figure 2, showing the improved fuel supply regulator valve.

The diagram of Figure 1 illustrates an oil burner head 2 driven by a suitable electric motor 4 which is connected to electrical circuit 6 in parallel with a supply control valve 10 which is to be described below as the preferred embodiment of this invention. From a fuel reservoir 12, a supply conduit 14 runs to supply control valve 10. A distributing conduit 16 runs from valve 10 to the burner.

Supply valve 10 consists mainly of a body 20 and a casing 18 secured to the body as by bolts 19. Valve body 20 is preferably cast in one piece and is provided with an inlet aperture 22 which connects to supply line 14 and is provided with an outlet aperture 24 which connects to distributing line 16. Disposed within inlet 22 is a conventional strainer assembly 19 which is threadedly mounted in body side aperture 21 so as to be removable for clean out purposes.

Cast integral with valve body 20 directly below aperture 21 is a downwardly and outwardly extending lip 23.

When the plug of strainer assembly 19 is removed any oil leaking through aperture 21 will be controllably deflected outwardly so that it may be caught in a drain pan or the like and will not spread over the outer valve surfaces or onto the floor.

Valve body 20 is internally formed with spaced chambers 25 and 26 having removable drain plugs at the bottom of the body. The upper end of chamber 25 is apertured to receive an upright elongated tubular casing 27 which is closed at its upper end and formed at its lower end with an opening 28 having a valve seat annulus 29 seated therein. The interior of casing 27 is in fluid communication with inlet 22 through lateral openings 30 in the casing, annular passage 31, bore 32, and strainer assembly 19.

A similar upright casing 33 is secured within the apertured upper end of chamber 26 and is formed with an opening 34 having a valve seat annulus 35. Casing 33 is formed with lateral wall openings 36 which open to a surrounding annular chamber passage 37. The connections between chamber 25 and casing 27, and between chamber 26 and casing 33, are rigid and oiltight so that all oil passing through the casings must pass through bores 28 and 34.

An intermediate metering chamber 38 is provided about midway between annular passages 31 and 37. Chamber 38 is in direct fluid communication with chamber 25 through an internal body passage 39, and the outlet from chamber 38 is a reduced cylindrical end bore 41 communicating with internal body passage 42 leading to annular passage 37.

Elongated valve members or plungers 43 and 44 having lower conical seat portions adapted to fit with valve seats 29 and 35 are slidably mounted and guided within casings 27 and 33, and normally seat under the force of gravity to close bores 28 and 34. The upper ends of casings 27 and 33 extend above valve body 20 and within suitable electrically parallel solenoid assemblies 45 and 46 within casing 18 and when energized through line 6 the solenoid assemblies simultaneously lift valves 43 and 44 to permit flow of oil through bores 28 and 34. Valve members 43 and 44 are preferably of iron or some other material of high magnetic permeability, as are end plates 47 and 48 of the solenoids.

Valve seats 29 and 35 are preferably of some metal or other material which is wear resistant, non-magnetic so as not to tend to stick to the valves when the latter became magnetized and is resistant to the corrosive and chemical action of the usual fuel oils and the impurities in them.

Bottom plates 49 and 51 of the solenoids are flat and fit snugly on suitable flat machined surfaces on the top of body 20. Plates 49 and 51 preferably fit snugly about casings 27 and 33 to inhibit leakage of oil upwardly from the body passages 31 and 37, and suitable concentric annular oil trap grooves 52 are provided in body 20 and shoulders on casings 27 and 33 which seal against entry of dirt or exit of oil.

In operation, when the solenoids are energized to unseat the parallel valves and the burner is operating, oil from reservoir 12 flows by gravity through conduit 14 to the valve 10, where it flows through inlet 22, strainer assembly 19, bore 32, passage 31, openings 30 and bore 28 to chamber 25. From chamber 25 the oil flows through passage 39, metering chamber 38, bore 41, passages 42 and 37, openings 36 and bore 34 into chamber 26, from which latter it emerges through outlet 24 and conduit 16 to the burner. In general the valve and this operation are similar to the system and valve disclosed in United States Letters Patent Nos. 1,965,053 and 1,965,054, issued to applicant July 3, 1934, to which reference is made for further detail. The present invention comprises details of the above described structure which differ from the disclosure in those patents and in particular comprises the novel metering valve arrangements for controlling the flow of oil through intermediate chamber 38 to be described below.

Figures 4, 5:
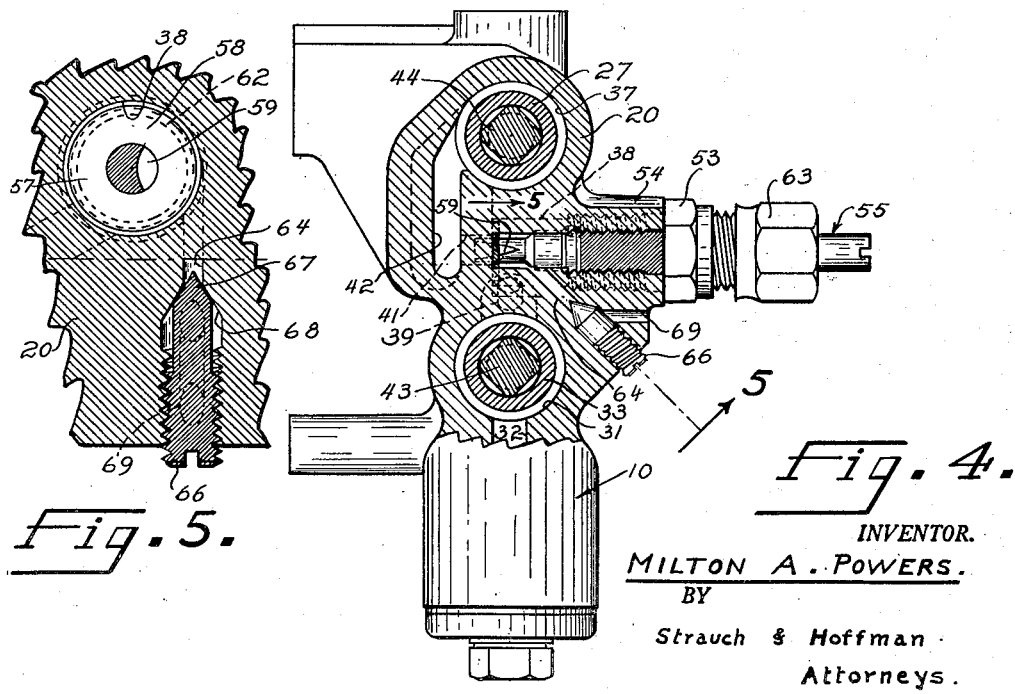
Figure 4 is a section substantially along line 4—4 of Figure 3 particularly showing the airbleeder valve of this invention.
Figure 5 is a fragmentary view substantially along line 5—5 of Figure 4 illustrating further details internally of the valve.

Referring particularly to Figures 3 and 4, intermediate chamber 38 is in communication with passage 42 only through cylindrical bore 41. A valve stem supporting sleeve 53 horizontally disposed and threadedly mounted in a hollow boss 54 opening into intermediate chamber 38 serves as an oiltight plug to prevent the communication of chamber 38 with the atmosphere.

A valve stem 55 concentric with bore 41 is threadedly rotatably mounted within sleeve 53 and has its outer slotted extremity 56 available externally of valve 10 for manipulation by a screw driver or the like. The inner reduced cylindrical extremity 57 of valve stem 55 projects through the close fitting circular aperture of a thin flat metal annular valve element or washer 58 into bore 41. The peripheral surface of cylindrical extremity 57 is formed with a slot or groove 59, which is of generally increasing size toward the inner end of the valve stem. Inwardly of bore 41, chamber 38 is formed with a flat machined valve seat 61 concentric with and in a plane perpendicular to the axis of bore 41. Element 58 is resiliently axially urged into flat oiltight sealing engagement with seat 61 as by a coiled compression spring 62 surrounding the valve stem and reacting between sleeve 53 and washer element 58, but is capable of radial sliding on seat 61 without destroying the oiltight seal.

Preferably valve stem extremity 57 fits within the thin circular opening of element 58 with a minimum clearance to permit relative axial displacement of the two when the valve stem is rotated. This clearance can be made very small, in the order of .0005 inch and there is substantially no oil leakage through element 58 along the cylindrical surface of extremity 57. The clearance between extremity 57 and bore 41, which was critical in prior type valves such as those in the above cited patents, is no longer important and can be made as large as desired. Oil leakage outwardly along valve stem 55 is prevented by a suitable gland assembly indicated at 63.

Horizontally disposed within valve body 20 is passage 64 which opens into the top of metering chamber 38. Disposed within passage 64 and having its body threadedly engaged therewith is bleeder valve member 66. Conical valve shank 67 of valve member 66 is capable of seating on a tapered shoulder 68 of passage 64 thereby closing the passage at that point. A bleeder passage 69 is open to the atmosphere and connects to passage 64 outwardly of shoulder 68. Valve 66 is normally closed, but may be opened to release air pockets that may enter with the oil and become trapped in chamber 38.

During operation the flow of fuel through intermediate chamber 38 is restricted by the orifice formed between valve stem extremity 57 and thin element 58. When the valve stem is adjusted by rotating it within sleeve 53, the size of the orifice is varied. Since slot or groove 59 is preferably cut progressively deeper toward the inner end of the valve stem, rotation of valve stem 55 to advance it to the left in Figure 3 progressively and uniformly decreases the area of the orifice, and opposite rotation of stem 55 progressively and uniformly increases the area of the orifice.

The outer diameter of element 58 being smaller than the diameter of seat 61 permits the element sufficient clearance to shift radially as may be required by any eccentricity in the valve stem as the latter is screwed either in or out for adjustment. During this radial shift element 58 remains oil tight with face 61 as urged by spring 62. As mentioned above the clearance between valve stem 55 and bore 41 is made adequately large to take care of all possible eccentricities.

It is apparent that no manufacturing tolerance need be provided to compensate for any relative eccentricity between the valve stem and the opening of element 58 during either assembly or adjustment. Therefore a close but sliding fit is maintained between them assuring that an accurate control of the flow of the fuel can be maintained even at a very low feeding rate.

An important improvement of the invention over the prior metering valves of the above cited patents is that in the invention the orifice is thin-walled in an axial direction. This reduces the tendency of foreign particles to lodge within and clog the orifice and promotes continuous even flow of oil.

Valve members 43 and 44 remain in their uppermost positions until the circuit to the burner motor is opened, at which time the solenoid coils will be de-energized permitting the valve members to move to their lower positions shown in Figure 2, due to gravity.

It will be noted that the valve members 43 and 44 are mechanically independent of each other. Therefore, when the solenoid coils are de-energized, the valve members are free to fall independently of each other and, if a foreign body in the oil prevents the seating of one valve, the remaining valve is not affected and acts in a normal way in stopping the flow of the oil through valve 10.

Air which may become pocketed in intermediate chamber 38 of valve body 20 may be bled from the system by bleeder valve 66. When the bleeder valve is unseated the pressure of the fuel will force the pocketed air through passage 64 and bleeder passage 69 into the atmosphere.

The plugs in lower extremities of chambers 25 and 26 may be removed for the purpose of cleaning out the valve body. Conventional strainer assembly 19 is made removable for cleaning purposes, and lip 23 directs the escaping fluids into a drain pan thereby keeping clean the valve body and all other parts.

It is not essential that valve stem extremity 57 be cylindrical or that the cooperating slidable surfaces of extremity 57 and element 58 have any particular contour other than the provision of special groove or slot 59.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid flow control valve, a valve body having an aperture surrounded by a radial valve seat face, an axially thin apertured valve element slidably disposed against said face, resilient means for urging said element against said face with sufficient force to provide substantially fluidtight engagement of said element with said face while permitting substantially radial movement of said element on said face, an axially movable valve stem rotatably mounted on its longitudinal axis and having a portion of longitudinally uniform size projecting through said apertures in the element with a sliding substantially fluidtight fit, and a groove which is appreciably longer than the thickness of said element at said aperture and is of changing size in said longitudinal direction formed on the outer surface of said valve stem portion and cooperating with said element to provide a fluid metering orifice that is varied in size when said valve stem is axially moved, and said element being capable of radial float on said face to effectively compensate for any eccentricities in the valve stem when the latter is rotated.

2. In a valve assembly, a valve body having an internal chamber provided with fluid inlet and outlet openings, a flat radial valve seat face surrounding said outlet opening, an axially thin apertured valve element, resilient means urging said element against said face, a valve stem having a portion threadedly mounted in said body for axial adjustment of said stem by rotation thereof and having an inner portion of uniform size longitudinally slidably projecting through the aperture in said element, and a groove which is appreciably longer than the thickness of said element at said aperture and of changing size longitudinally of said valve stem formed in the peripheral surface of said inner portion and cooperating with said element to provide an axially thin fluid metering orifice, said orifice being varied in size when said valve stem is rotated to axially displace said inner portion, and said element having radial float on said face in the event of eccentricity of said valve stem during rotation.

3. In the valve assembly defined in claim 2, said valve element being a thin flat washer-like element.

4. In a fluid flow control valve, a passage having an end surrounded by a flat valve seating face, a thin flat valve element, means for resiliently axially urging said element against said face in substantially fluidtight relation, said element being apertured, a valve stem mounted for rotation about its longitudinal axis and having a portion of uniform size longitudinally projecting through said aperture in slidable engagement with said element with such accurate fit and small clearance that flow of fluid along the relatively slidable surfaces of said stem portion and element is substantially prevented while permitting said axial displacement of said stem with respect to said element, said element being radially slidable on said face while maintaining said fluidtight relation between the element and face, and a groove in the peripheral surface of said stem where the latter projects through said element providing a fluid metering orifice in said valve, said groove being of changing size longitudinally of said stem whereby said orifice is varied in size when said stem is longitudinally displaced and having a length that is appreciably greater than the axial distance of peripheral sliding contact between said valve stem portion and said thin flat valve element so as to provide an axially thin non-clogging metering orifice.

5. In a liquid flow control valve, a body having an opening, a substantially radial flat face surrounding one side of said opening, a thin annular valve plate mounted on said face with its aperture substantially aligned with said opening, an axially movable valve stem mounted on said body and having a portion of uniform size along its length in substantially liquidtight sliding engagement with said aperture, a compressed spring surrounding said valve stem portion and urging said plate against said seat, and a longitudinal groove of changing size in the periphery of said valve stem portion where the latter projects through said plate, said groove having a length appreciably greater than the axial distance of contact between said valve stem portion and said plate and cooperating with said plate aperture to provide an axially thin liquid orifice for metering flow of liquid through said opening.

6. In a liquid flow control device, a member having an opening, a substantially radial flat face surrounding said opening on one side, a thin washer having a circular aperture smaller than said opening slidably mounted on said flat face with said aperture defining an axially short surface, a spring urging said washer against said face, an axially movable valve stem having a cylindrical end portion extending through said aperture in substantially liquidtight sliding engagement with said axially short surface, and a longitudinal groove appreciably longer than said axially short surface and of changing size along its length formed in the periphery of said valve stem end portion where the latter projects through said washer, said groove cooperating with said washer to provide an axially thin liquid orifice for metering flow of fluid through said opening.

MILTON A. POWERS.

References Cited in the file of this patent

UNITED STATES PATENTS

| Number | Name | Date |
|---|---|---|
| 424,715 | Knickerbacker | Apr. 1, 1890 |
| 868,757 | Bennett | Oct. 22, 1907 |
| 991,550 | Serrell | May 9, 1911 |
| 1,039,391 | Hazelip | Sept. 24, 1912 |
| 1,391,403 | Rapp | Sept. 20, 1921 |
| 1,585,726 | Lawton | May 25, 1926 |
| 1,804,462 | Eggleston | May 17, 1931 |
| 1,918,891 | Barrett | July 18, 1933 |
| 1,936,975 | Wasson | Nov. 28, 1933 |
| 1,965,053 | Powers | July 3, 1934 |
| 1,965,054 | Powers | July 3, 1934 |
| 2,197,271 | Kerrick | Apr. 16, 1940 |
| 2,206,361 | Mackay | July 2, 1940 |
| 2,330,610 | Natter | Sept. 28, 1943 |
| 2,375,980 | Du Charme | May 15, 1945 |
| 2,398,370 | Gentzel | Apr. 16, 1946 |

FOREIGN PATENTS

| Number | Country | Date |
|---|---|---|
| 93 | Italy | of 1889 |
| 24,189 | Great Britain | of 1912 |